(12) United States Patent
Duesman et al.

(10) Patent No.: US 6,217,232 B1
(45) Date of Patent: Apr. 17, 2001

(54) METHOD AND APPARATUS FOR ALIGNING AN OPTIC FIBER WITH AN OPTO-ELECTRONIC DEVICE

(75) Inventors: Kevin Duesman, Boise; Warren M. Farnworth, Nampa, both of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/046,546

(22) Filed: Mar. 24, 1998

(51) Int. Cl.$^7$ ....................................................... G02B 6/36
(52) U.S. Cl. ................................. 385/88; 385/14; 385/49
(58) Field of Search .................... 385/49, 88, 89, 385/14; 29/846, 847, 850, 852, 853

(56) References Cited

U.S. PATENT DOCUMENTS

| | | |
|---|---|---|
| 5,012,323 | 4/1991 | Farnworth . |
| 5,062,565 | 11/1991 | Wood et al. . |
| 5,145,099 | 9/1992 | Wood et al. . |
| 5,218,229 | 6/1993 | Farnworth . |
| 5,319,725 * | 6/1994 | Buchmann et al. ................ 385/14 |
| 5,440,240 | 8/1995 | Wood et al. . |
| 5,483,174 | 1/1996 | Hembree et al. . |
| 5,483,741 | 1/1996 | Akram et al. . |
| 5,484,314 | 1/1996 | Farnworth . |
| 5,487,999 | 1/1996 | Farnworth . |
| 5,495,667 | 3/1996 | Farnworth et al. . |
| 5,515,468 | 5/1996 | DeAndrea et al. . |
| 5,578,934 | 11/1996 | Wood et al. . |
| 5,585,282 | 12/1996 | Wood et al. . |
| 5,592,736 | 1/1997 | Akram et al. . |
| 5,606,182 | 2/1997 | Yoshida et al. . |
| 5,607,818 | 3/1997 | Akram et al. . |
| 5,617,495 | 4/1997 | Funabashi et al. . |
| 5,661,831 | 8/1997 | Sasaki et al. . |
| 5,666,450 | 9/1997 | Fujimura et al. . |
| 5,675,685 | 10/1997 | Fukuda et al. . |
| 5,677,878 | 10/1997 | Shirley et al. . |
| 5,678,301 | 10/1997 | Gochnour et al. . |
| 5,686,317 | 11/1997 | Akram et al. . |
| 5,686,318 | 11/1997 | Farnworth . |
| 5,691,649 | 11/1997 | Farnworth . |
| 5,693,558 | 12/1997 | Lee et al. . |
| 5,703,974 | 12/1997 | Sasaki et al. . |
| 5,708,741 | 1/1998 | DeVeau . |
| 5,721,797 * | 2/1998 | Basavanhally et al. ................ 385/49 |
| 5,764,832 * | 6/1999 | Tabuchi ................. 385/49 |
| 5,909,524 * | 6/1999 | Tabuchi ................. 385/49 |
| 6,009,218 * | 12/1999 | Grand et al. ............................ 385/14 |

* cited by examiner

Primary Examiner—John D. Lee
Assistant Examiner—Juliana K. Kang
(74) Attorney, Agent, or Firm—Dickstein Shapiro Morin & Oshinsky LLP

(57) ABSTRACT

The present invention provides a method and apparatus for mounting an opto-electronic device on a substrate and aligning it with an optic fiber. The opto-electronic device is mounted on the substrate and aligned with the optic fiber by using a plurality of complementary features formed on the substrate and the opto-electronic device. An additional feature is formed on the substrate for holding the optic fiber in a predetermined alignment relative to the substrate. The complementary features are sized and configured to engage each other to provide a bonding surface for joining the opto-electronic device to the substrate. In addition, the features are arranged to provide an aligning function so that the opto-electronic device can only have one orientation when mounted on the substrate, and that orientation is selected to align the output of the opto-electronic device with the optic fiber.

22 Claims, 3 Drawing Sheets

METHOD AND APPARATUS FOR ALIGNING AN OPTIC FIBER WITH AN OPTO-ELECTRONIC DEVICE

The present invention relates to methods and apparatus for coupling an optic fiber to the output of an opto-electronic device. In particular, the invention relates to methods and apparatus for easily aligning the optic fiber with the output of the opto-electronic device using complementary features formed on mounting surfaces of a substrate and the opto-electronic device.

BACKGROUND OF THE INVENTION

The speed of computers has been continuously increasing in recent years. Physical size limitations of the components, however, are imposing limitations on future speed increases. That is, the dimensions of the conductors formed in the integrated circuits have shrunk to the point the conductors are themselves beginning to restrict current flow.

One approach to increasing the speed of computers has been to use light to transmit data between components of a computer. The use of fiber optic transmission lines has several advantages over conventional electrical cables. For example, fiber optic materials frequently cost less than electrical cables. Moreover, the power required to drive optic signals is frequently less than that required for many electrical cables. Furthermore, optical transmission of data provides an enhanced rate of information transfer over longer distances. Using optical transmission, manufacturers can mount a light source on one component, such as a microprocessor, and a receiver on another component, such as a memory device, and connect the light source and the receiver with an optic fiber.

In practice, manufacturers use transceivers that convert electrical signals to transmitted optical signals and convert received optical signals to electrical signals. These transceivers, known as opto-electronic devices, must be precisely aligned with optical fibers to transmit the data between various components. A major disadvantage of the use of opto-electronic devices is the difficulty of aligning the output of the opto-electronic device with the optic fiber. In particular, current alignment procedures are very labor intensive using very expensive machines. Hence, their cost makes them relatively expensive and generally limits their applicability. If the alignment could be automated, a substantial savings in manufacturing time and money could be achieved, allowing wider application of the technology.

SUMMARY OF THE INVENTION

The present invention overcomes these disadvantages by providing a system for easily aligning an optic fiber with an opto-electronic device and providing a method for aligning the fiber and device that can be readily automated. The system comprises a substrate having a first mounting surface with a first plurality of features and an opto-electronic device having a second mounting surface with a second plurality of features. The second plurality of features is complementary to, and aligned for engagement with, the first plurality of features. The first plurality of features is positioned to align the output of the opto-electronic device with the optic fiber when they engage the second plurality of features. The first mounting surface also includes an optic fiber mounting feature, the feature being axially aligned with the output of the opto-electronic device.

In preferred embodiments of the invention, the first plurality of features includes a plurality of posts projecting upwardly from the first mounting surface and the second plurality of features includes a plurality of complementary recesses in the second mounting surface. According to one aspect of the invention, the first plurality of features and the second plurality of features include a data transmission pathway between the substrate and the opto-electronic device.

A method of aligning an optical fiber with an opto-electronic device comprises the steps of providing a substrate with a mounting surface, providing a first plurality of features on the mounting surface, providing a second plurality of features on the opto-electronic device that are complementary to the first plurality of features and configured to engage the first plurality of features, and mounting the opto-electronic device on the mounting surface with the first plurality of features engaging the second plurality of features. The method further includes the step of providing an optic fiber-mounting feature on the mounting surface that is axially aligned with an output axis of the opto-electronic device.

In preferred methods, the step of providing a first plurality of features on the mounting surface includes the step of etching a plurality of posts onto the mounting surface, the step of providing a second plurality of features on the opto-electronic device includes the step of etching a plurality of recesses into a surface of the opto-electronic device, and the step of providing an optic fiber-mounting feature includes the step of etching a channel into the mounting surface.

According to one aspect of the invention, the step of providing a first plurality of features includes the steps of determining a plurality of etching points, etching the mounting surface at the plurality of etching points to define a perimeter around each feature of the first plurality of features, and removing a portion of the mounting surface outside the perimeter of each feature. The step of providing a second plurality of features includes the steps of determining a plurality of etching points, etching the mounting surface at the plurality of etching points to define a perimeter around each feature of the second plurality of features, and removing a portion of the mounting surface inside the perimeter of each feature.

These and other features and advantages of the invention will become apparent from the following detailed description of preferred embodiments of the present invention.

DETAILED DESCRIPTION OF THE DRAWINGS

Figure 1:
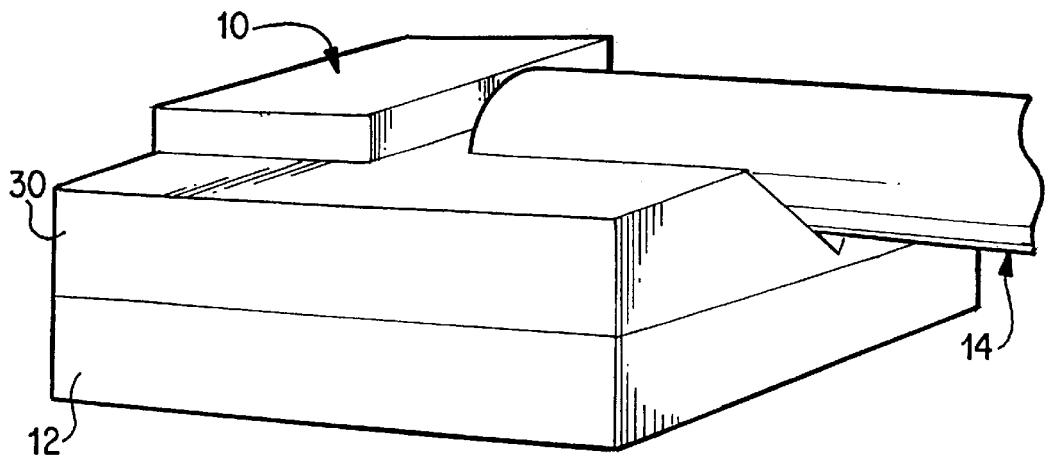
FIG. 1 is a perspective view of a optic fiber and an opto-electronic device mounted on a substrate with the optic fiber being aligned with the opto-electronic device.

FIG. 1 illustrates an opto-electronic device 10 mounted on a substrate 12 and aligned with an optic fiber 14 in accordance with the present invention. The substrate 12 can be a silicon substrate having embedded circuitry to form, for example, a microprocessor, memory device, IC, or the like, and the opto-electronic device 10 can be a laser diode or other light source, a photoreceiver or the like, or a transceiver. The optic fiber 14 is preferably a multifiber optic cable. The opto-electronic device 10 is mounted on the substrate 12 and aligned with the optical axis of the optic fiber 14 by using a plurality of complementary features formed on a mounting surface 30a of the substrate 12 and mounting surface 30b of the opto-electronic device 10. An additional feature is formed on the substrate 12 for holding the optic fiber 14 in a predetermined alignment relative to the substrate 12. The complementary features are sized and configured to engage each other to provide a bonding surface for joining the device 10 to the substrate 12. In addition, the features are arranged to provide an aligning function so that the device 10 can only have one orientation when mounted on the substrate 12, and that orientation is selected to align the output of the device 10 with the optic fiber 14.

Figure 2A:
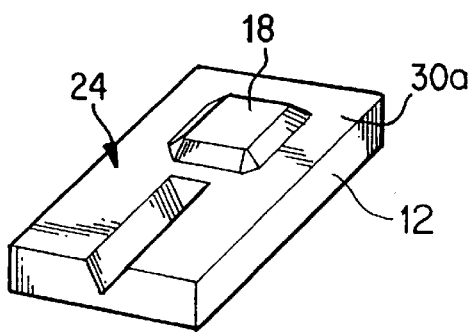
FIGS. 2a, 2b illustrate a post and optic fiber-receiving channel formed in a mounting surface and a recess formed in a mounting surface.
Figure 2B:
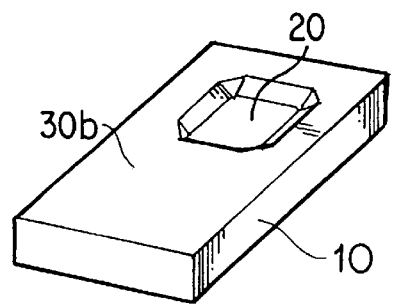
Figure 3:
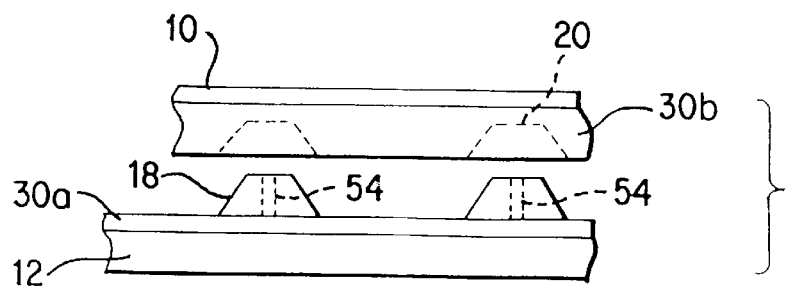
FIG. 3 is a side view of an opto-electronic device in position above a substrate with recesses in the device aligned with posts on the substrate.

In preferred embodiments, the complementary features can be posts 18, illustrated in FIG. 2a, formed on either the substrate 12 or the opto-electronic device 10 and matching recesses 20, illustrated in FIG. 2b, formed on the other. FIGS. 2a, 2b illustrate only a portion of the mounting surface 30 and only show a single post 18 and recess 20, respectively. It will be appreciated that, preferably, three or more posts 18 and recesses 20 will be formed on the mounting surfaces 30a, 30b so as to provide only one possible alignment. Alternatively, a single non-symmetrical post 18 and recess 20 can be used, but multiple posts 18 and recesses 20 are preferred. When the posts 18 and recesses 20 have been formed, the opto-electronic device 10 can be mounted on the substrate, as illustrated in FIG. 3. It is also possible to provide a mix of posts 18 and recesses 20 on each, so long as they are arranged to provide the aligning function. The optic fiber alignment feature can be a V-shaped channel 24, illustrated in FIG. 2a, for receiving the optic fiber 14 and retaining it in a predetermined alignment relative to the device 10, aligned by posts 18 and recesses 20.

Figure 4:
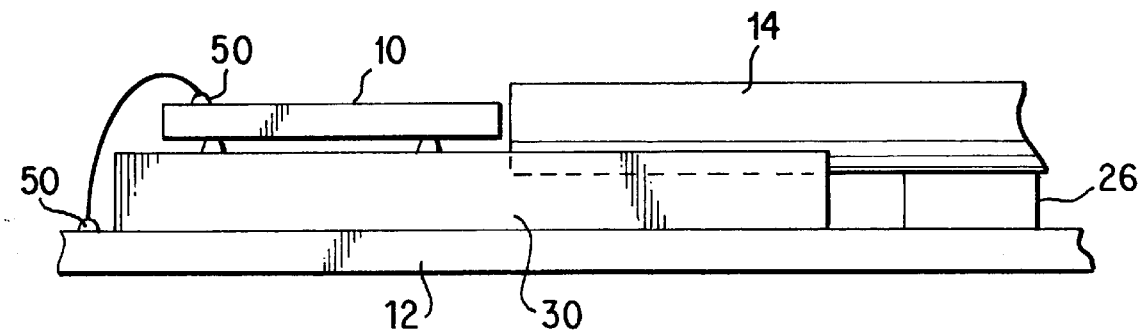
FIG. 4 is a side view of an opto-electronic device and optic fiber mounted on a substrate.

As illustrated in FIG. 4, the opto-electronic device 10 and substrate 12 can include bonding pads 50 to provide an electrical connection therebetween. Alternatively, the etched posts and recesses can be used to provide an electrical pathway between the device 10 and the substrate 12. For example, the posts can include one or more conductors 54 electrically coupled to a terminal of the substrate 12, illustrated in FIG. 3, and the recesses can likewise contain mating conductors located at a terminal of the opto-electronic device 10. Thus, when the posts engage the recesses, the posts provide an electrical pathway for data or power to pass between the substrate 12 and the opto-electronic device 10. It will be understood that other conventional means can be used to electrically couple the opto-electronic device 10 to the substrate 12.

Figure 5:
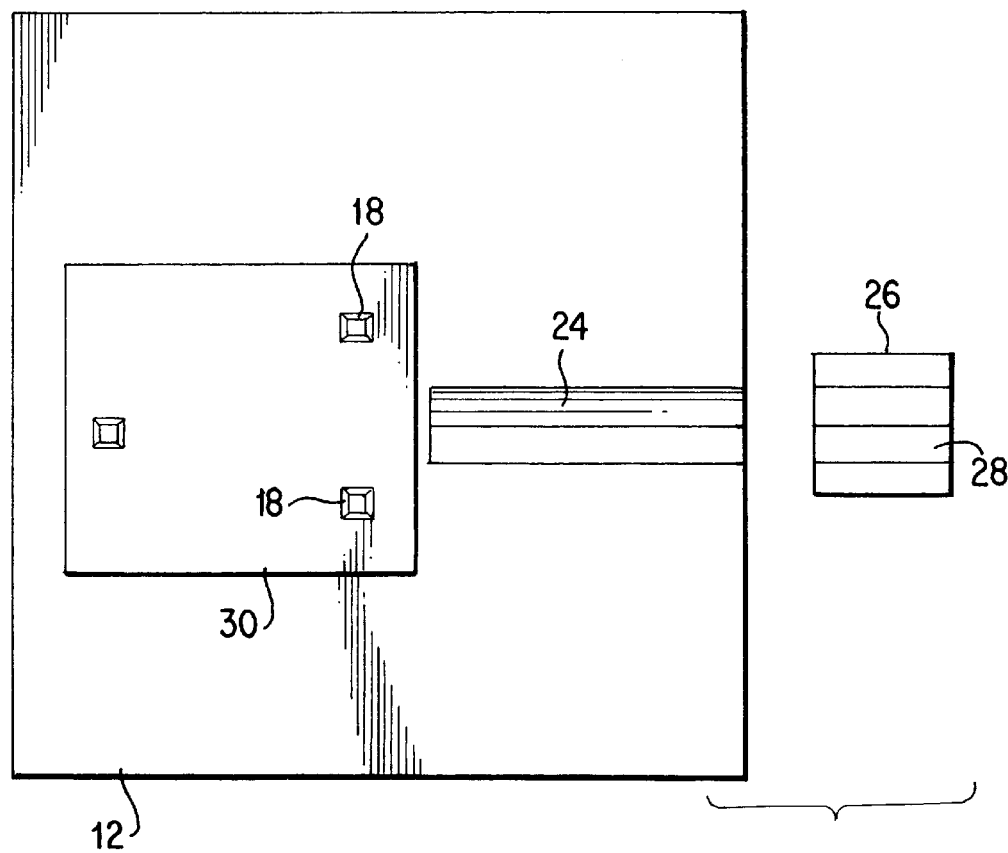
FIG. 5 is a plan view of the substrate illustrating a plurality of posts and an optic fiber-receiving channel formed on the substrate.

The posts 18 and recesses 20 are preferably arranged so that there is only one way of mounting the opto-electronic device 10 on the substrate 12. For example, as illustrated in FIG. 5, the posts can be arranged in a triangular pattern (non-equilateral triangle) such that recesses 20 on the opto-electronic device 10 will only align with and engage the posts 18 on the substrate 12 if the output axis of the opto-electronic device 10 is aligned with an optic fiber 14 disposed in the channel 24. A multifiber optic cable is preferred because it will ensure that at least one fiber will be aligned with the output of the opto-electronic device 10 to carry the optical signal. As illustrated in FIGS. 4, 5, a support block 26 for supporting the optic fiber 14 can be located on, or adjacent, the substrate 12, and can include a channel 28 aligned with channel 24 (FIG. 5). The support block can be bonded directly to the substrate or can include parts 18 recesses 20 so that it can be aligned with the channel 24.

Referring to FIG. 5, the channel 24 is disposed to align the optical axis of the optic fiber 14 with the output axis of the opto-electronic device 10. in particular, the axis of the channel 24 is etched into the mounting surface 12 in a predetermined relationship with the posts 18 to ensure proper alignment. Preferably, a multifiber optic cable can be used to facilitate alignment although a single fiber may be used. A multifiber cable ensures that at least one fiber is aligned with the output of the opto-electronic device 10. Accordingly, a machine can be programmed to mount the opto-electronic device 10 and the optic fiber at a substantial reduction in cost and time.

In operation, the posts 18 and recesses 20 can be formed using conventional deposition and etching techniques. As is known, a mounting surface 30 can be formed on a substrate by standard deposition techniques. Using a mask 32, a particular pattern can be formed in the mounting surface 30 by etching away appropriate portions of the mounting surface by applying an etching material. For example, a mounting surface 30 made of silicon (Si) can be etched by applying an etching substance, such as potassium hydroxide (KOH).

Figure 6A:
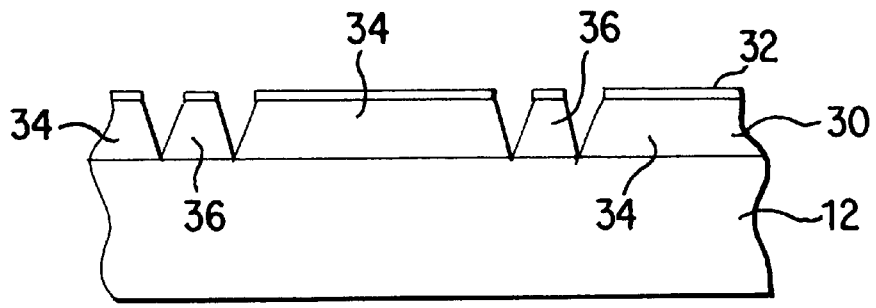
FIGS. 6a, 6b, and 6c illustrate methods of manufacturing posts and recesses in the mounting surface of a substrate or opto-electronic device.
Figure 6B:
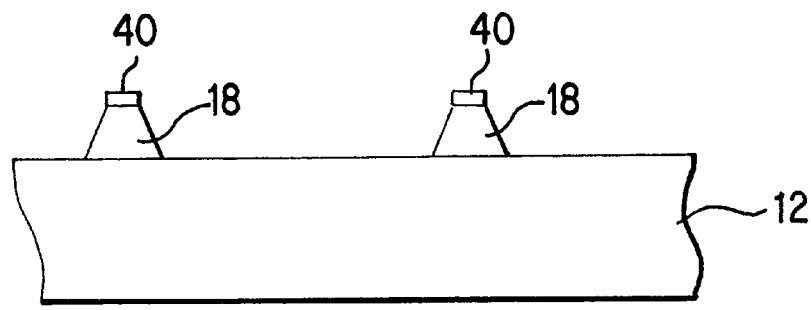
Figure 6C:
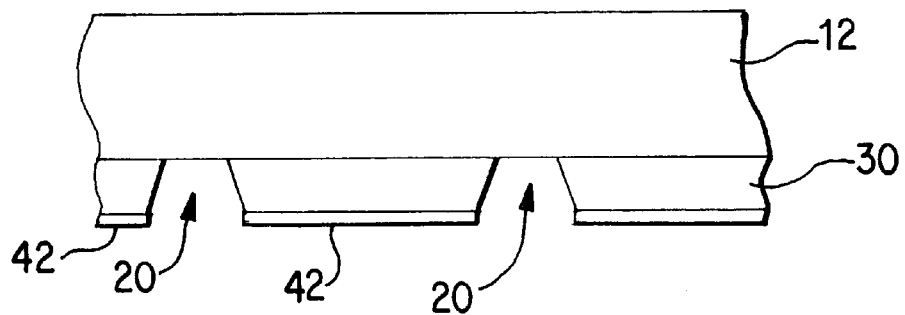

It is known that certain etching materials always etch features having the same slope. For example, KOH always etches 111—monocrystalline at a 55° slope, as illustrated in FIGS. 6a–6c. Thus, each pit etched into the silicon surface has sidewalls with a 55° slope. Taking advantage of that fact, it is possible to etch closely matching posts and recesses in opposing surfaces of items that are to be joined together. For example, a plurality of pits can be etched in the silicon such that the pits cooperate to define a perimeter around a post or recess, as illustrated in FIG. 6a. Once the perimeter has been formed, the silicon outside the perimeter, indicated at 34, can be etched away, leaving a post 18 projecting upwardly from the substrate 12. On the other hand, if the material within the perimeter, indicated at 36, is etched away, a recess 20 is formed in the silicon layer. Alternatively, a mask 40 may be applied to the silicon to define the top surface 18a of the posts and the remaining surface area can be etched away to a predetermined depth, as illustrated in FIG. 6b, providing posts 18 with 55° sloping sides. Similarly, a mask 42 can be applied to the mounting surface to define the recess 20, so that subsequent etching removes material to form the recess 20, as illustrated in FIG. 6c. With respect to the channel 24, an appropriate mask is used for etching to form a longitudinal channel, again with 55° sloping sides. Of course, other combinations of deposition and etching materials are available that will provide posts and recesses having sides with slopes other than 55 degrees.

It will be apparent that, by proper placement of a mask 40, 42, posts can be etched onto the mounting surface of either the substrate 12 or the opto-electronic device 10 and matching recesses can be etched into the surface of the other. Once the posts and recesses are formed, the items can be joined together by bonding the posts to the recesses, making sure that good electrical contact is obtained between device 10 and device 12.

Although the invention has been described with respect to mounting an opto-electronic device on a substrate for purposes of data transmission, it will be apparent to those of ordinary skill in the art that the invention is more widely applicable. For example, the substrate can be a test fixture for testing lasers or other opto-electronic devices.

The above descriptions and drawings are only illustrative of the preferred embodiments which achieve the objects, features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A system for aligning an optic fiber with an opto-electronic device, the system comprising:
    a substrate having a first mounting surface with a first plurality of features; and
    an opto-electronic device having a second mounting surface with a second plurality of features, the second plurality of features being complementary to, and aligned for engagement with, the first plurality of features, the first plurality of features being positioned to align the output of the opto-electronic device in a predetermined orientation when they engage the second plurality of features, wherein
    at least one feature of the first plurality of features and the second plurality of features include an electrical pathway within said at least one feature for interconnecting the substrate and the opto-electronic device.

2. The system of claim 1 wherein the first mounting surface includes an optic fiber mounting feature for mounting at least one optic fiber on said substrate, the feature being axially aligned with an optical axis of the opto-electronic device.

3. The system of claim 2 wherein the first plurality of features includes a plurality of posts projecting upwardly from the first mounting surface and the second plurality of features includes a plurality of complementary recesses in the second mounting surface.

4. The system of claim 2 wherein the first plurality of features includes a plurality of posts projecting from the second mounting surface and the second plurality of features includes a plurality of complementary recesses formed in the first mounting surface.

5. The system of claim 2 wherein the optic fiber mounting feature includes a fiber-receiving channel, the channel including a pair of sidewalls, each sidewall having a 55 degree slope.

6. The system of claim 1 wherein the opto-electronic device includes at least one first bonding pad and the substrate includes at least one second bonding pad, the at least one first bonding pad and the at least one second bonding pad being electrically interconnected.

7. The system of claim 1 wherein the substrate includes one of a microprocessor, a memory device, an IC, and an opto-electronic device.

8. A system for aligning an optic fiber to an opto-electronic device, the system comprising:
    a substrate having a first mounting surface;
    at least one optic fiber coupled to the first surface; and
    an opto-electronic device having a second mounting surface, a plurality of spaced-apart posts projecting from one of the first and second mounting surfaces and a plurality of spaced-apart recesses formed in the other of the first and second mounting surfaces, the recesses being located for engagement with the posts, the posts and recesses being positioned to align an output of the opto-electronic device with said at least one optic fiber, wherein
    at least one of said spaced-apart posts includes an electrical pathway within said at least one spaced-apart posts for interconnecting the substrate and the opto-electronic device.

9. The system of claim 8 further including a cable receiving groove formed in the first mounting surface, and wherein said at least one optic fiber is a cable of optic fibers, said groove aligning said cable with the output of the opto-electronic device.

10. A method comprising the steps of:
    providing a mounting surface;
    providing a first plurality of features on the mounting surface;
    providing a second plurality of features on an opto-electronic device, the second plurality of features being complementary to the first plurality of features and configured to engage the first plurality of features so as to allow the opto-electronic device to be mounted to the mounting surface in one predetermined orientation;
    providing an electrical pathway within at least one feature of said first plurality and second plurality of features for interconnecting the mounting surface and the opto-electronic device, and
    mounting the opto-electronic device on the mounting surface with the first plurality of features engaging the second plurality of features.

11. The method of claim 10 further including a step of providing an optic fiber-mounting feature on the mounting surface, the optic fiber-mounting feature being axially aligned with an optical axis of the opto-electronic device.

12. The method of claim 11 wherein the step of providing a first plurality of features on the mounting surface includes a step of etching a plurality of posts onto the mounting surface and the step of providing a second plurality of features on the opto-electronic device includes a step of etching a plurality of recesses into a surface of the opto-electronic device and the step of providing an optic fiber-mounting feature includes the step of etching a channel into the mounting surface.

13. The method of claim 10 wherein the step of providing a first plurality of features on the mounting surface includes a step of etching a plurality of posts onto the mounting surface and the step of providing a second plurality of features on the opto-electronic device includes a step of etching a plurality of recesses into a surface of the opto-electronic device and the step of providing an optic fiber-mounting feature includes the step of etching a channel into the mounting surface.

14. The method of claim 10 wherein the step of providing a first plurality of features includes the steps of determining a plurality of etching points, etching the mounting surface at the plurality of etching points to define a perimeter around each feature of the first plurality of features, and removing a portion of the mounting surface outside the perimeter of each feature.

15. The method of claim 10 wherein the step of providing a second plurality of features includes the steps of determining a plurality of etching points, etching the mounting surface at the plurality of etching points to define a perimeter around each feature of the second plurality of features, and removing a portion of the mounting surface inside the perimeter of each feature.

16. A method comprising the steps of:

providing a first mounting surface on a substrate;

providing a second mounting surface on an opto-electronic device;

etching a plurality of posts onto one of the first and second mounting surfaces;

etching a plurality of post-receiving recesses into the other of the first and second mounting surfaces;

providing an electrical pathway for interconnecting the substrate and the opto-electronic device within at least one of said plurality of posts; and positioning the opto-electronic device on the first mounting surface with the recesses aligned to receive the posts.

17. The method of claim 16 further including the step of etching an optic fiber-receiving channel in the first mounting surface, the longitudinal axis of the channel being aligned with an optical axis of the opto-electronic device.

18. A system for aligning an optic fiber with an opto-electronic device, the system comprising:

a substrate having a mounting surface with a plurality of etched posts and an etched optic fiber aligning channel disposed in a predetermined relationship with the posts; and an opto-electronic device having a mounting surface with a plurality of etched recesses, the recesses being complementary to, and located to receive, the plurality of posts, wherein at least one of said posts includes an electrical pathway within said at least one of said posts for interconnecting the substrate and the opto-electric device.

19. The system of claim 18 further comprising an electrical connector attached to at least one of the posts and at least one of the recesses such that said electrical pathway interconnects the substrate and the opto-electronic device when said plurality of recesses has received said plurality of etched posts.

20. A die for transmitting data via an optical data path comprising:

a mounting surface;

an opto-electronic device having an output axis;

a plurality of posts extending upwardly from the mounting surface, the posts being disposed in a predetermined pattern about the output axis of the opto-electronic device, at least one of the posts also including an electrical pathway within said at least one of the posts for interconnecting the mounting surface and the opto-electronic device; and a channel formed on the mounting surface for receiving an optic fiber, a longitudinal axis of the channel being aligned with the output axis of the opto-electronic device.

21. The die of claim 20 further including an opto-electronic device having a plurality of recesses aligned to receive the posts, the opto-electronic device being bonded to the die at points of contact between the posts and recesses.

22. The die of claim 21 wherein the mounting surface includes a first plurality of bonding pads and the opto-electronic device includes a second plurality of bonding pads electrically coupled to the first plurality of bonding pads.

* * * * *